Figure 1:
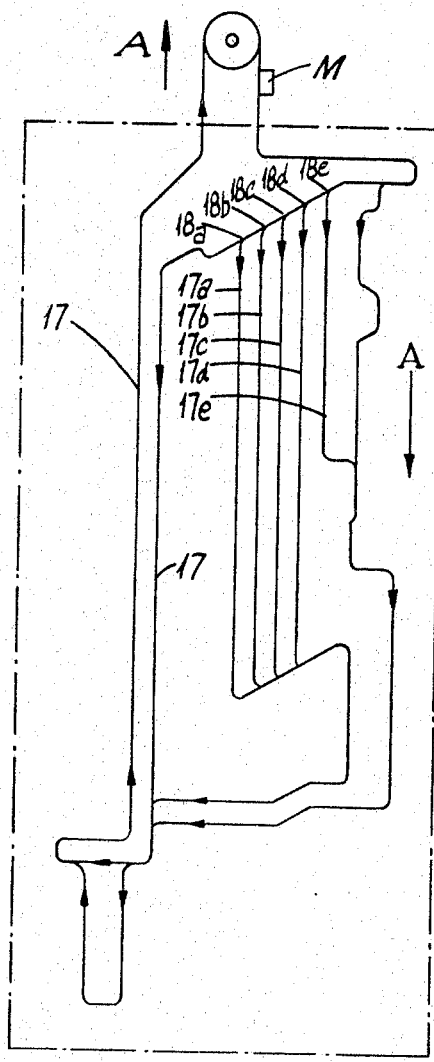

Aug. 8, 1967  O. J. B. ORWIN  3,334,594
CONVEYOR SYSTEMS

Filed Dec. 1, 1964  9 Sheets-Sheet 1

INVENTOR.
OLAF JOHN BARCLAY ORWIN

Aug. 8, 1967    O. J. B. ORWIN    3,334,594
CONVEYOR SYSTEMS

Filed Dec. 1, 1964    9 Sheets-Sheet 5

INVENTOR
OLAF JOHN BARCLAY ORWIN
BY
agent

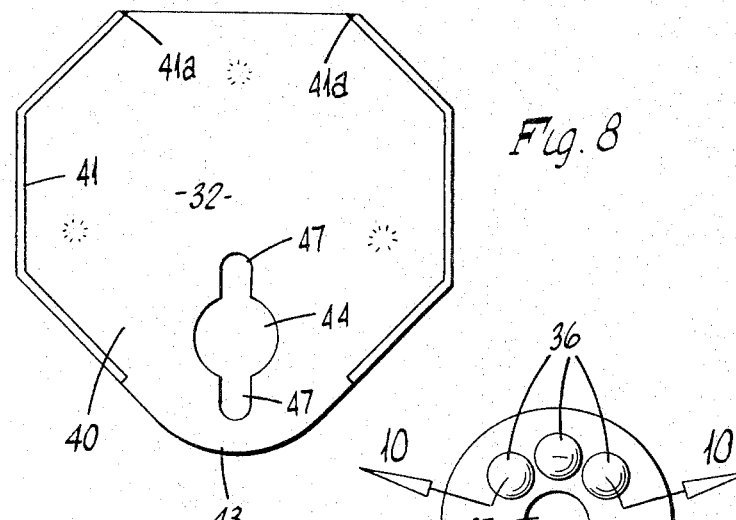
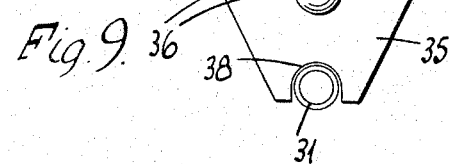
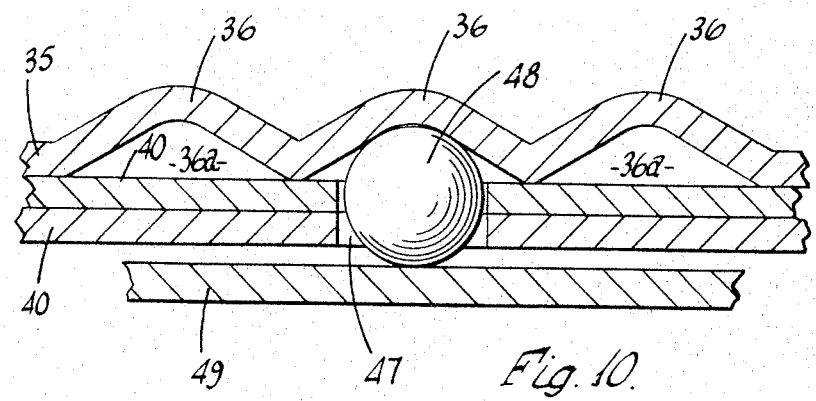

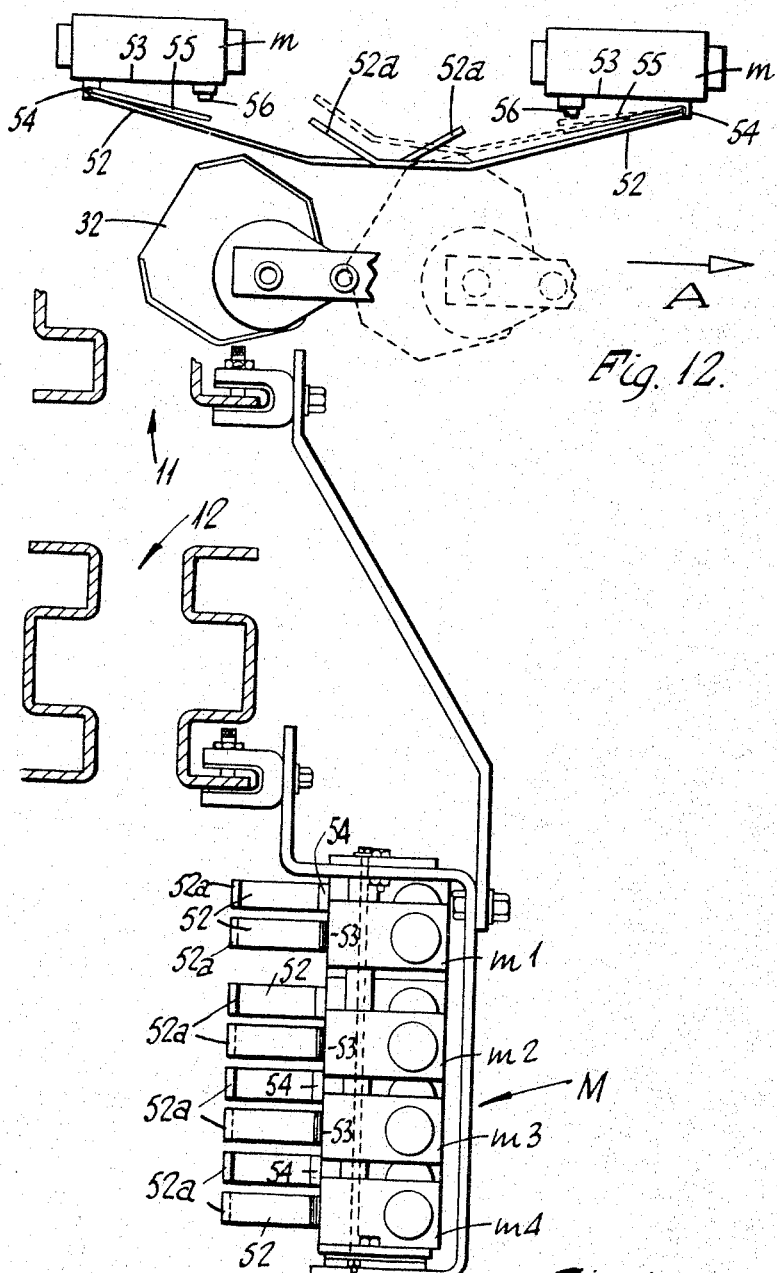

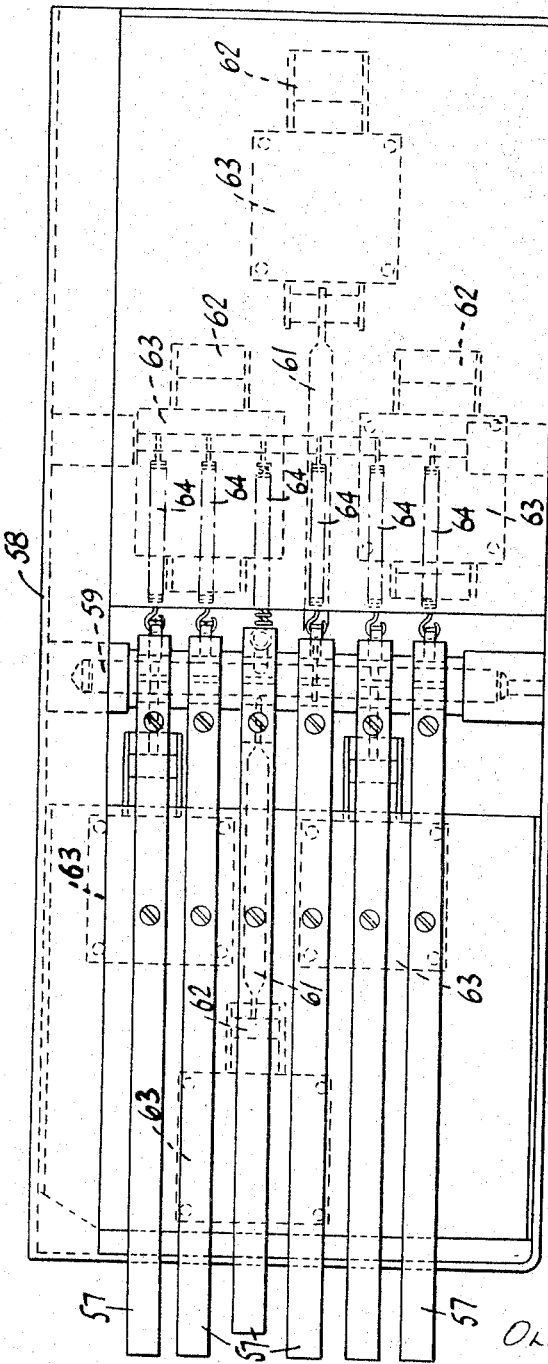

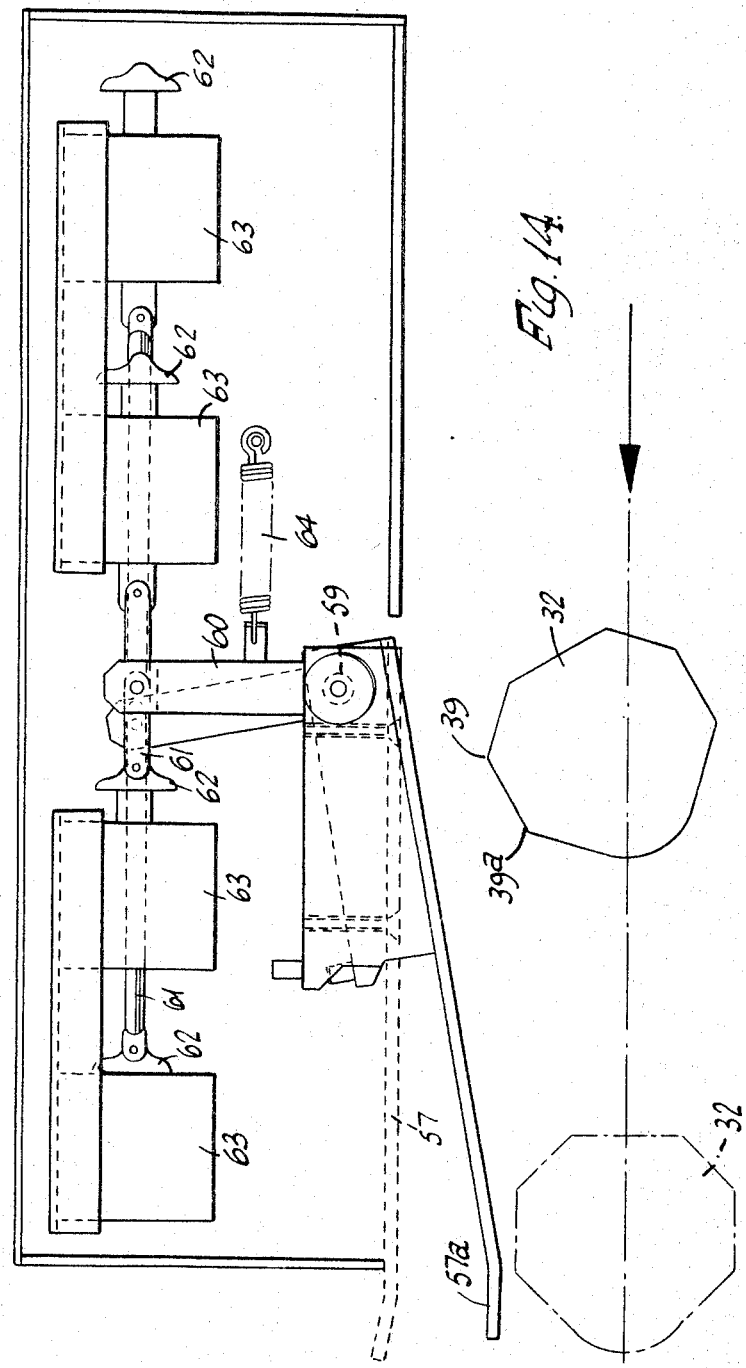

United States Patent Office

3,334,594
Patented Aug. 8, 1967

3,334,594
CONVEYOR SYSTEMS
Olaf J. B. Orwin, Quinton, Birmingham, England, assignor to Fisher & Ludlow Limited, Tipton, England, a British company
Filed Dec. 1, 1964, Ser. No. 415,116
Claims priority, application Great Britain, Dec. 10, 1963, 48,775/63
6 Claims. (Cl. 104—88)

This invention relates to conveyor system for conveying articles of the kind comprising a movable conveying element provided with article supporting members, and a stationary track element from which the conveying element is supported. The invention is concerned with such conveyor systems wherein one of said two elements, i.e. either the track element or the conveying element, is provided with one or more pre-selectable control means each adapted to co-act with one or more operating means associated with the other of said two elements and adapted to initiate a particular operation of the conveyor system, for example, the loading or unloading of a particular article or set of articles or the arresting, starting, or other change in the movement of the conveying element itself, including one or more of the article supporting members themselves. Conveyor systems having the foregoing characteristics specified in this paragraph are herein referred to as conveyor systems of the kind specified.

Such conveying element may comprise, for example, an endless conveyor chain on which the article supporting members e.g. suspension hooks, are directly mounted, or it may comprise, for example, an endless conveyor chain together with a plurality or article advancing members constructed separately from the chain and supported from the track element, the separate article advancing members being adapted to be advanced by means of the conveyor chain aforesaid.

Hitherto it has commonly been the practice for the pre-selectable control means to comprise a number of pegs mounted for endwise movement in an appropriately apertured supporting member usually in the form of a plate, each peg being displaceable in an endwise direction, i.e. in the direction of its length relative to the plate between an operative or set position and an inoperative position.

Such hitherto commonly provided form of pre-selectable control means entails the disadvantage that the selector pegs thereof when set or re-set, have to be moved endwise during the continued advancement of the conveying element by a force applied to the pegs acting along the length thereof, and where as is frequently the case the control means is advanced by the conveying element itself, the pre-selector pegs are necessarily subjected to a certain side thrust when pressure is applied to the selector pegs to set or re-set them so as to produce a considerable frictional resistance to the setting or re-setting movement of the pegs even though these may be so constructed that when in the setting position they only offer a relatively small resistance to a purely endwise thrust.

A further disadvantage of this existing arrangement arises from the fact that usually the selector pegs are retained in their set position by means of springs, circlips, or spring loaded ball bearings operating in a groove or grooves in the peg with the result that the setting or re-setting endwise movements of the pegs as well as their displacement into their inoperative position must be very precise, i.e. plus or minus 1/32" to 1/16". This precise movement is difficult to achieve in practice because in conveyor systems relatively large tolerances have to be accepted if the parts are to be made at a commercially acceptable price.

Still a further disadvantage is that if for any reason a selector peg is slightly displaced endwise from its set position it is in now way self returning to that position and any slight displacement in an endwise direction may accordingly impair the operation of the conveyor system.

The present invention has for its object to provide an improved arrangement of conveyor system of the kind specified which avoids the foregoing disadvantages of the existing arrangement above referred to.

According to the present invention we provide a conveyor system of the kind specified which is characterized by embodying one or more pre-selectable control means comprising one or more control elements mounted for rotational as opposed to sliding movement upon a supporting member, so as to be displaceable relative to the supporting member into one or more pre-selected positions, means being provided for releasably retaining each control element in the pre-selected position and means being provided for returning each control element to its pre-selected position in the event of the control element being turned relative to its supporting member out of a pre-selected position through an angular distance less than half the distance required to displace the control element rotationally from the pre-selected position to the next rotationally adjacent position relative to its supporting member.

Such adjacent position may be a second pre-selected operative position or it may be a designed inoperative position.

Whatever may be the nature of this next adjacent position it will be understood that by the present invention in the event that the control element concerned is displaced undesirably out of its pre-selected position by a distance less than half the rotational distance through which it must be displaced into the next adjacent designed position, the control element is self-returning to the selected position. Such an arrangement ensures that undesirable fouling of a control element by one of the operating means referred to, e.g. a micro switch, will not necessarily interfere with the operation of the conveyor system.

Also if the rotational displacement of the control element from its pre-selected position exceeds one half of the full angular distance requisite to rotate the control element into the next adjacent rotational position it will not return to such immediately previous pre-selected position, so that the displacement of the control element into a second position is not interfered with by the nature of the self returning characteristics provided.

A further advantage of the present invention is that by mounting each control element for rotational as opposed to sliding movement, resistance to displacement of the control element from one position to another is small and very much less than is the case where the control element is mounted for endwise sliding movement.

Figure 2:
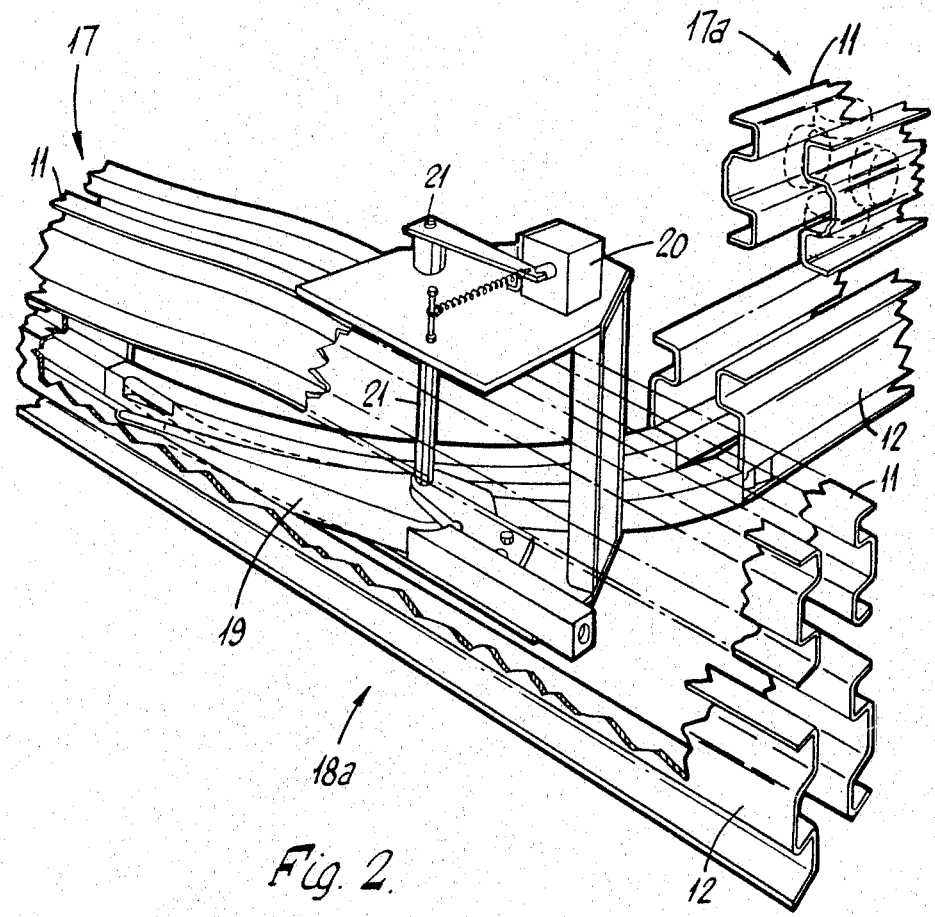
Figure 3:
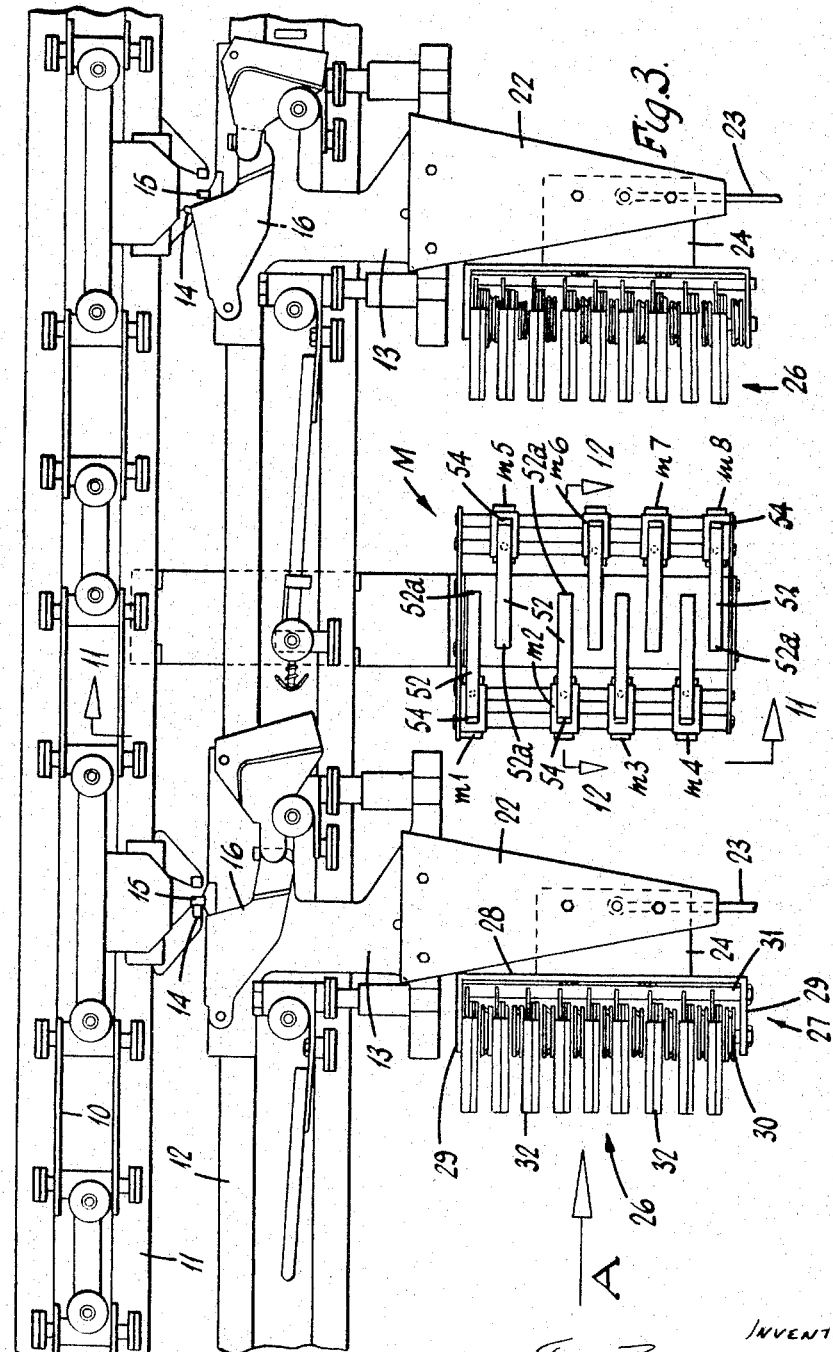
Figure 4:
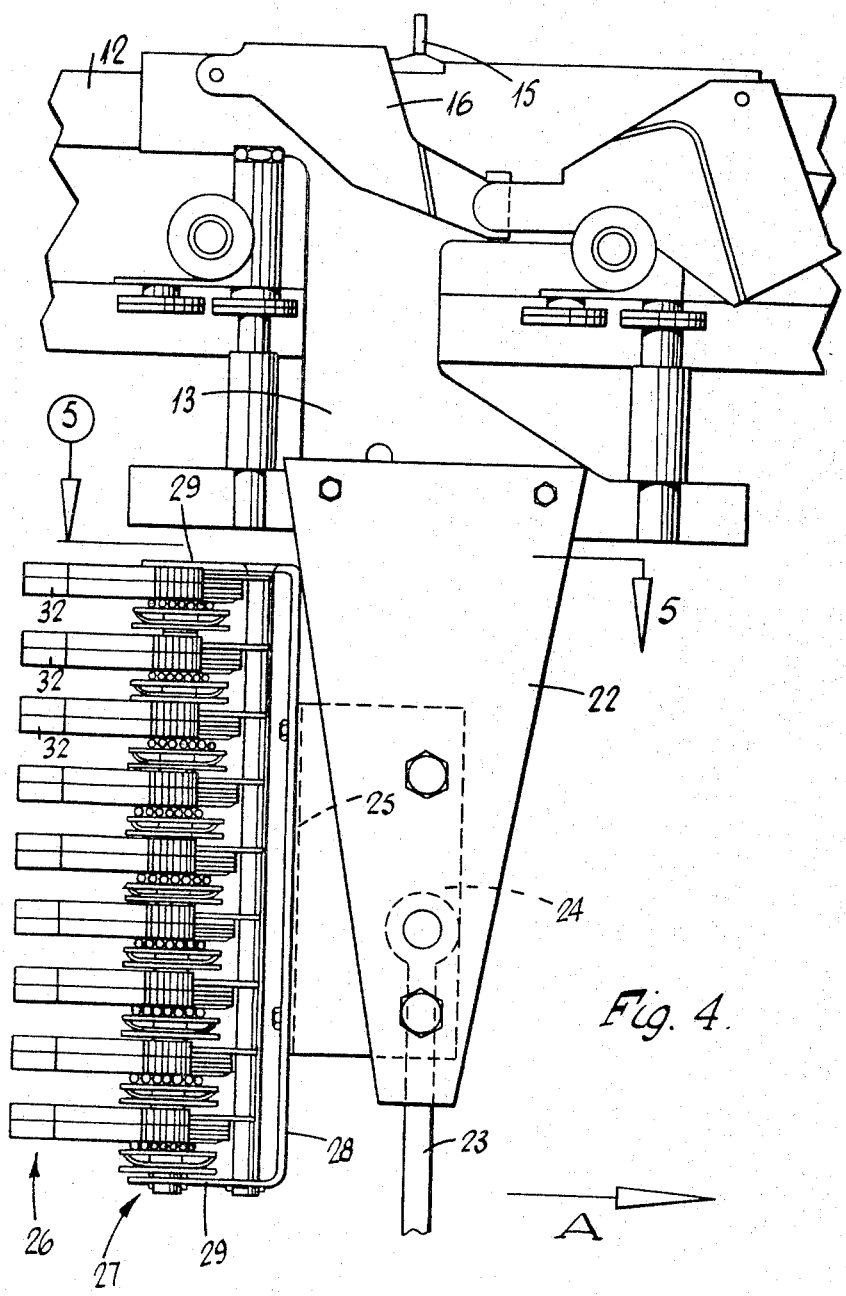
Figure 5:
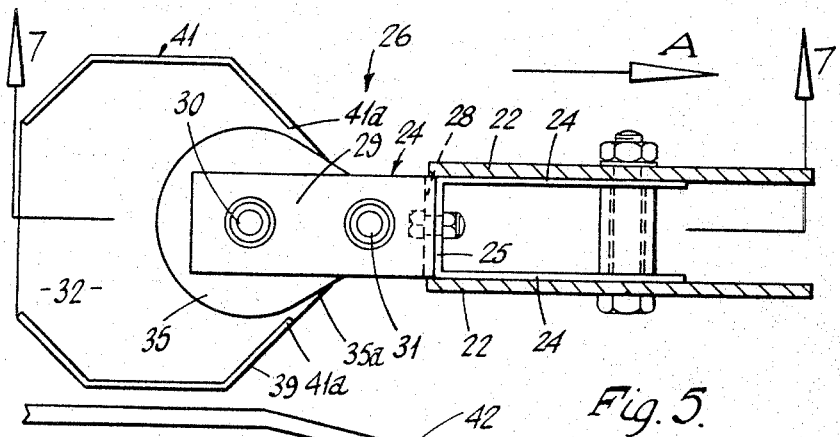
Figure 6:
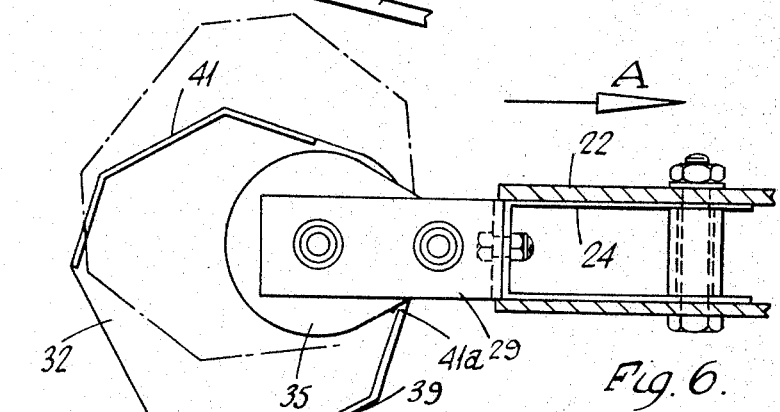
Figure 7:
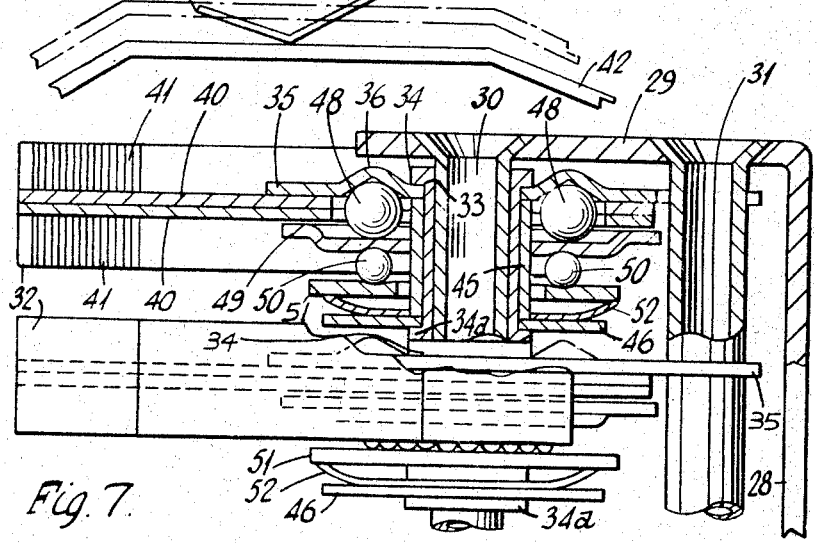

The invention is illustrated in the accompanying drawings, wherein:

FIGURE 1 is a schematic view showing the general layout of one form of conveyor system to which the present invention is applicable, FIGURE 2 is a perspective view of a track switch arrangement applicable to the conveyor system depicted in FIGURE 1, FIGURE 3 is a side elevation of part of the conveyor system depicted in FIGURE 1, FIGURE 4 is a side elevation to an enlarged scale of part of the construction shown in FIGURE 3, FIGURE 5 is a sectional plan view to an enlarged scale on the line 5—5 of FIGURE 4, and showing one of the rotationally mounted control elements in its non-operative rotational position, FIGURE 6 is a view similar to FIGURE 5 but showing one of the control elements rotated into one of its operative positions, FIGURE 7 is a part sectional view on the line 7—7 of FIGURE 5, FIGURES 8 and 9 are plan views of two of the components of the control element depicted in FIGURES 5 to 7, FIGURE 10 is a detail view of part of the same construction, FIGURE 11 is a sectional view to an enlarged scale on the line 11—11 of FIGURE 3, FIGURE 12 is a plan view of part of the construction shown in FIGURE 11, showing the mode of operation of a micro switch by one of the control elements, FIGURES 13 and 14 are respectively elevation and plan views of a control element resetting device applicable to the construction of FIGURES 1 to 12.

Referring firstly to FIGURES 1 to 3 of the drawings, the conveyor system there depicted is of the general form described in the specification of prior U.S.A. patent application No. 318,900, now Patent No. 3,230,897, and comprises a plurality of power driven endless conveyor elements 10 in the form of endless conveyor chains, supported for advancement along a corresponding chain track 11, beneath each of which chain tracks 11 is mounted a trolley track 12 supporting a plurality of wheeled article conveying trolleys 13.

As described in the prior specification, each conveyor chain 10 is provided at intervals along its length with trolley driving dogs 14 mounted for vertical movement relative to the associated chain between a lower driving position in which it has driving engagement with a driving abutment 15 fixed to each trolley, and an upper disengaged position. Movement of each dog 14 into the upper position is effected by dog lifting means 16 as described in the prior specification to thereby effect arrest of each trolley 13.

As shown in FIGURE 1, the conveyor system embodies a main conveyor chain and a trolley track collectively designated 17 and in the known manner a plurality of branch conveyor chain and trolley tracks collectively designated 17a, 17b etc., with trolley switch means of known form as depicted in FIGURE 2 for switching advancing trolleys from the main track 17 to each of the several branch tracks and provided at each of the junctions 18a, 18b etc., between the main track 17 and each branch track 17a, 17b. Each such trolley switch means comprises as shown in FIGURE 2, a known form of switch tongue 19, movable between the main track position depicted in dotted outline in FIGURE 2 and the main to branch track position as depicted in full outline in this figure. Such movement of each switch tongue 19 is effected in the known manner by solenoid 20 connected to switch tongue operating spindle 21, the solenoid being controlled by one of the microswitches m of a bank M of microswitches supported from the trolley track 12 and chain track 11 and of the form depicted in FIGURES 3, 11 and 12 which bank is disposed at the position M in FIGURE 1. Each of the several microswitches respectively designated m1, m2 in FIGURES 3 and 11 are connected to a corresponding switch tongue solenoid 20 provided at each of the track junctions 18a, 18b etc. as shown diagrammatically in FIGURE 1.

One embodiment of the means for controlling the operation of these solenoids and associated switch tongues in accordance with the present invention will now be described with reference at first to FIGURES 3 to 10 of the drawings.

As shown in FIGURES 3 and 4, each trolley 13 has mounted thereon a dependent article supporting bracket 22 the lower end of which carries a dependent article supporting suspension hook, part of which is shown at 23. Each article supporting bracket 22 has attached thereto the two arms of a U-shaped attachment bracket 24, the web 25 of which (see FIGURE 5), has secured thereto pre-selectable control means 26 in accordance with this invention. Each such control means 26 comprises a frame 27 of channel configuration, the web 28 of which is secured to bracket web 25. The frame 27 has the two sides 29 thereof spaced vertically apart and connected together by a pair of vertically extending parallel tubes 30, 31.

The tube 30 which is furthest from the frame web 28 constitutes with the frame 27, a supporting member for each of the several pre-selectable control elements 32 of each control means 26, the required number of which elements 32 are mounted on the tube 30 at intervals along its length so as to be in vertically spaced relationship.

For this purpose the supporting member tube 30 has mounted thereon a number of supporting member sleeves 33 (see FIGURE 7), corresponding one to each element, each sleeve 33 being flanged outwardly at each end thereof at 34 and 34a.

Adjacent one of the two flanges, namely 34, of each sleeve 33 and disposed in substantially horizontal position, is a supporting plate 35 formed with a number, e.g. three pairs of retaining openings in the form of recesses which as shown comprise conical shaped depressions 36 (see FIGURES 9 and 10), the depressions 36 being formed in the face of the supporting plate which is furthest from the adjacent sleeve flange 34. These depressions 36 are of wide conical form, so as to be of wide V form in any cross section passing diametrically through the centre or base of the depression and the two depressions in each pair are arranged on diametrically opposite sides of the associated flanged sleeve 33 which sleeve passes through an aperture 37 (see FIGURE 9), formed centrally in the supporting plate 35.

Conveniently where three such pairs of depressions are provided, these adjacent depressions are spaced angularly by 45° from one another about the central axis of the flanged supporting sleeve 33.

Rotation of each supporting plate 35 about the axis of the associated flanged sleeve 33 and thus about the axis of the supporting member tube 30 is positively prevented by forming the plate at one edge portion thereof with a recess 38 which receives the other tube 31 of the two tubes 30, 31 connecting together the two sides 29 of the supporting member frame 27.

Each control element 32 is formed by welding together two flat peripheral flanged plates 40 the flanges 41 of which are of small depth, and extend vertically in opposite directions away from each other. These flanges 41 serve to stiffen the periphery of the assembled together plates and thus prevent deformation of the periphery of the so formed control element 32 when this engages with the operating means above referred to, e.g. the operating arm 42 (see FIGURES 3 and 12), of one of the aforementioned microswitches in between which and the control element 32 relative movement is occurring consequent on the advancement of the trolleys 13 of the conveyor system, namely in the direction of arrow A in FIGURES 1, 3, 4, 5 and 6.

As shown, each control element 32 is of general octagonal shape when viewed in plan but with one of the eight edges thereof conveyedly curved at 43 with the remaining seven edges straight, and adjacent this curved edge 43 the control element is formed with a hole 44, the centre of which may be coincident with the axis of curvature of such edge. Thus the hole is eccentric in relation to the centre of the control element formed by the two plates 40.

Each hole 44 is circular and receives a cylindrical thimble 45 of bore corresponding to the external diameter of each supporting member sleeve 33, the thimble 45 extending between the adjacent supporting plate 35 and a retaining washer 46 at the opposite end of the supporting member sleeve 33, which washer is itself in abutment with the adjacent flange 33a of the sleeve 33 so that the thimble 45 is thereby located against axial movement relative to the sleeve 33.

Each thimble 45 has a diameter slightly less than the bore of each control element hole 44 so as to provide a bearing for the control element 32 permitting of this rotating about the axis of the supporting member tube 30.

As shown in FIGURE 8, the control element 32 at positions on diametrically opposite sides of the cylindrical hole 44 therein is formed in its two plates 40 with a slot 47 of width less than the radius of the hole and merging therewith, and in each of these slots is disposed a retaining ball 48 of diameter slightly less than the width of the slots 47.

The arrangement is such that each of the two retaining balls 48 is normally in engagement with one of the two depressions 36 of each set of depressions in the adjacent supporting plate 35 so as to be aligned with the bottom of each such depression as shown in FIGURE 10.

As shown in FIGURES 7 and 10 the two balls 48, at the sides thereof furthest from the supporting plate 35 having the conical depressions, are engaged by a thrust plate 49 of circular form having a peripheral stiffening flange and the face of the thrust plate 49 furthest from the two retaining balls is itself engaged by a set of thrust balls 50 and is spring loaded in a direction towards the supporting plate 35 through the medium of a pressure plate 51 which as in the case of the thrust plate is slidable axially along the exterior of the adjacent thimble 45. A spring washer 52 or other suitable form of loading spring is provided between the pressure plate 51 and the retaining washer 46 at the adjacent end of the thimble, i.e. at the end of the thimble furthest from the supporting plate 35.

The arrangement is such that the thrust plate 49 which engages with the two retaining balls 48, urges the latter under the spring loading towards the base of the two depressions 36 of each of the several sets of depressions, but the thrust plate 49 is free to turn about the thimble 45, i.e. is quite free to rotate relative to both the control element 32 and the supporting plate 35, such rotational movement being further facilitated by the provision of the thrust balls 50 bearing between the thrust plate 49 and the spring loaded pressure plate 51.

Each of the ball locating and retaining depressions 36 above mentioned have their centres disposed on a common pitch circle of diameter corresponding to the distance between the centres of the two balls within the diametrically opposed slots 47 in each control element 32.

The circular shaped mouth 36a of each conical shaped depression 36, and which lies in the same plane as the surface of the supporting plate having the depression, is in each case of a diameter greater than the diameter of each of the balls 48 and preferably about one and a half times such diameter. In one preferred arrangement in which each ball 48 has a diameter of 0.25 in., the diameter of the depression mouth 36a is about .38 in. while each depression 36 may have a maximum depth of about .11 in. with the thickness of the supporting plate 35 of the order of .065 in.

Also the cone angle of each depression 36 may be of the order of 120° so that each ball 48 when fully within the depression makes contact therewith along a circle extending around the base of the depression. Thus, each ball has line as opposed to area engagement with the depression when fully therewithin and this fact together with the wide cone angle so that each side of the depression is inclined at only about 30° to the adjacent plane of the supporting plate 35 permits of the balls 48 readily climbing out of the depressions by a rolling movement when a control element 39 is displaced from one angular position to the other about the axis of tube 30, i.e. during the setting or re-setting of such element thereof.

The diameter of the mouths 36a of the depressions 36 and the diameter of the pitch circle passing through their centres and which is centred on the axis of rotation of the control element 32 is such that the depressions which are angularly spaced at 45° to one another have their mouths contiguous with one another (see FIGURE 9). The arrangement is such that when a ball 48 passes from one depression to an adjacent depression spaced angularly by 45° about the rotational axis, the ball under the spring loading aforementioned is self returning into that depression which is circumferentially nearest to it. The balls 48 will then be retained in such depressions under the pressure of the adjacent spring 52 which acts to displace each control element 32 with its associated balls 48 axially of the associated bearing thimble 45 in a direction towards the corresponding supporting plate 35.

Accordingly, when a control element 32 is rotated in a direction to displace its associated pair of balls 48 from one set of depressions 36 to the next set spaced angularly therefrom by 45°, if the total rotational movement imparted to the control element is less than half 45°, i.e. less than half the complete movement required for bringing the balls fully from one set of depressions to the next adjacent set to be retained therein, the control element 32 will return to its initial position under the spring loading.

Thus, the control element 32 is self-retaining, i.e. self-returning to its existing position, if subjected to small angular displacements of magnitude less up to half the full angular displacement requisite to set it in a different angular position. At the same time if the control element 32 is displaced through more than half such full angular displacement, it will complete its angular movement, i.e. through 45° in all, into the next successive angular position.

The arrangement may if desired, be such that if the control element 32 is moved angularly by say 60% of the distance required to reach its final position, it will make the remaining movement of itself whether it is for setting or resetting. If, on the other hand, it is slightly fouled by any operating arm of a micro switch or other operating means which is slightly out of its intended position so that the control element is forced undesirably to come slightly out of its existing position, it will immediately, up to say 40% of such distance aforementioned corresponding to an angular movement of up to 18°, return to its original setting.

In any event, unlike the peg type pre-selector earlier described, such undesired slight fouling of the control element according to the present invention, does not result in any damage to any part of the conveyor system.

The angular movement of the control elements 32 is facilitated by the free rotational mounting of the ball engaging thrust plate 49 permitted by ball thrust bearing 50, which as it can rotate relative to element 32, enables the balls to roll freely into and out of the depressions 36 so that the only resistance to rotation of the control element is that provided by spring 52. Thus the control elements 32 can rotate freely between their desired positions under the control of spring 52.

As will be understood from the foregoing description, particularly with reference to FIGURE 7 of the drawings, each of the control elements 32 together with its associated supporting plate 35 and supporting member sleeve 33, as well as the balls 48 and the spring loaded thrust plate 49, including the loading means, constitutes a self contained unit, the various parts of which are held in position on the sleeve 33 by the flanges 34 and 34a at each end of the sleeve.

Each of these self contained units embodying a control element 32 is adapted to be mounted independently of each other upon the supporting member tube 30, by simply sliding thereon each sleeve 33 with its associated parts. Thus the foregoing construction permits, as will be apparent from a consideration of FIGURES 4 and 7, of any desired number of control elements 32 readily to be assembled each as a self contained unit in axially aligned relationship on the supporting member tube 30 with the adjacent control elements 32 spaced apart from one another with the flange 34 of the supporting sleeve 33 of one control element 32 abutting with the adjacent flange 34a of the adjacent sleeve 33 of an adjacent control element unit. Such an arrangement readily permits of any desired number of control elements being mounted on each supporting tube 30 within the limits imposed by the overall length of the tube, as well as of a varying number of control elements 32 being mounted at different vertical spacings along the length of the supporting tube 30 as may be required by the particular conveyor system, the supporting sleeves 33 being replaced by spacer sleeves at those positions where control elements are not needed.

In the above described arrangement, the overall rotational movement of each control element 32 is 90°, rotational movement through more than 90° being limited by cutting away one of the two flanges 41 of the two flange plates 40. In practice for simplicity in manufacture, the flanges of both plates would be similarly cut away. The cutting away of the one flange 41 is at a position where the associated plate 40 is adjacent to its corresponding supporting plate 35, so that, as shown in FIGURE 6, the cut away edge 41a (see FIGURE 5) of this flange 41 is adapted to abut with the adjacent edge 35a of the supporting plate 35 which lies immediately above the control element plate 40 having the aforementioned cut away flange.

Thus, each control element 32 has three different rotational positions, namely, the centre inoperative position depicted in FIGURE 5, in which the control element is angularly equidistant between its two extreme positions, one of which is depicted in full outline in FIGURE 6, and the other of which is indicated in depth outline in this figure, and it will be understood that in each of these three different angular positions which are angularly spaced at 45° increments, the pair of retaining balls 48 is in full engagement with one of the three pairs of ball receiving depressions 36.

With a control element in either of the two extreme or operative positions depicted in FIGURE 6, it will be understood that an edge portion 39 of the element projects by a greater distance into the path beyond the longitudinal centre line of the control track 12 then is the case where the control element is in the main position or inoperative position depicted in FIGURE 5.

With the control element in the operative position depicted in FIGURE 6, its edge portion 39 is adapted, as shown more particularly in FIGURES 3, 11 and 12, to engage with the operating means of microswitches for controlling the operation of switch tongues as depicted at 19 in FIGURE 2 provided at each of the track junctions 18a, 18b etc.

As shown in FIGURES 3 and 11, a bank of microswitches M is provided in the known manner, at a predetermined position along the length of the trolley track 12, each of the individual switches m1, m2, etc. of this bank being arranged in two sets with the two sets spaced horizontally apart along the length of the track as shown in FIGURE 3, with the several microswitches in each set spaced apart vertically, with the switches of one set staggered vertically in relation to the switches of the other set.

Each of these microswitches is provided with operating means in the form of a blade 52, with one end of each blade being supported from the housing 53 of the associated microswitch for pivotal movement relative to the housing about a vertically extending spring hinge 54 of known form, so that each blade is urged by a predetermined distance in a direction away from the associated housing 53.

The arrangement is such that the free end portions 52a of the blades associated with each of the two sets of microswitches in each bank M, project towards the other set of microswitches in the said bank, as clearly shown in FIGURE 12, with all of the several blades 52 of each bank being spaced vertically in relation to one another.

The vertical spacing of the blades 52 corresponds with the vertical spacing of the control elements 32 on their associated supporting member tube 30. Thus, each of the several control elements 32 is adapted when in one of its two operative positions, namely, the full line operative position depicted in FIGURE 6, to engage with a corresponding blade 52, but to have its lateral edges completely clear of the corresponding blade when advanced past it by the associated trolley with the control element concerned in the inoperative position depicted in FIGURE 5.

Each blade 52 adjacent its spring hinge 54, is connected to an arm 55, the free end of which engages with a switch button 56. The arrangement is such that normally each blade 52 under the loading of spring hinge 54, is, with its associated arm 55, displaced away from the microswitch button 56 and remains in such position out of the path of the corresponding advancing control element 32, when this is in the inoperative position. When the control element is displaced into the operative position as depicted in FIGURE 6, the edge portion 39 thereof engages with the free end portion 52a of the corresponding blade, irrespective of the direction in which the free end portion of the blade projects relative to the direction of trolley advancement. Thus, the blade engaged by such operatively disposed element in a direction towards its associated microswitch housing 53, namely, into the dashed line position depicted in FIGURE 12, to bring the associated arm 55 also into the dashed line position here shown, to engage with microswitch button 56 and thus actuate a solenoid 20 connected thereto to displace a switch tongue 19 into a position for advancing the trolley carrying such operatively disposed control element to the desired branch track 17a, 17b, etc.

Each of the several microswitches m1, m2, etc., is connected to a corresponding solenoid for controlling one of the junctions of the several branch tracks, and it will be understood that by preselecting a particular control element of a trolley and displacing such element into operative position, any trolley may be advanced into any of the several branch tracks depicted in FIGURE 1 in accordance with the requirements of the conveyor system.

Although as shown in FIGURE 12, the control elements 32 must all be displaced in one rotational direction from their inoperative position, depicted in FIGURE 5, to engage with the microswitch blades 52, the fact that the control elements can be displaced into a second operative position, as shown in dashed line in FIGURE 6, permits of the bank of microswitches with their associated blades 52 being disposed at either of the two opposite sides of the trolley track 12 as may be most convenient.

Resetting means of known form are provided as shown in FIGURES 13 and 14, for rotating the control elements from their operative position, depicted in FIGURE 6, to their inoperative position, depicted in FIGURE 5.

As shown in FIGURE 13, such resetting device comprises a bank of vertically spaced arms 57, supported from resetting frame 58, the several arms 57 being all mounted at one end thereof for pivotal movement about a common vertically extending pivot pin 59 carried from frame 58, which frame is adapted for mounting at a suitable position to one side of the trolley track 12.

Each of the resetting arms 57 carries, adjacent its pivot, a motion transmitting arm 60, connected through link 61 to armature 62 of solenoid 63, the arm 60 being also connected to return loading spring 64.

The arrangement is such that when the solenoid 63 associated with a particular resetting arm is energised, the arm is displaced from the dashed line inoperative position depicted in FIGURE 14, into the full line operative position in which the free end portion 57a of the arm is adapted to engage with the adjacent edge 39 of a control element 32 advancing past the arm 57, in the event of such control element being in the operative position as depicted in full outline in FIGURE 15, so as to displace the element rotationally into the dashed line inoperative position shown in this figure corresponding to the FIGURE 5 position.

Such displacement is a result of the wedging action between the corner 39a of the octagonal shaped control element 32 and the relatively rigid operatively disposed arm 57 which applies torque to the control element, thereby rotating the element into its inoperative position.

It will be understood that in applying such form of resetting device to the hitherto known slidable peg type pre-selectable means earlier referred to, the laterally directed thrust on the slidable pegs produced by the advancement of their free ends past the arms 57 when in operative position would with the axes of the pegs at right angles to the direction of trolley advancement, cause the pegs to bind in the housings in which they are slidable, and a resetting device, as shown in FIGURES 13 and 14 would then entail the disadvantage that resetting of the pegs into their inoperative position could not be relied upon.

It will be understood that the vertical spacing of the arms 57 corresponds to the vertical spacing of the several control elements 32 on each supporting tube 30, i.e. one arm 57 corresponds to each control element.

Each of the several solenoids 63 would be actuable in the known manner from a conveniently disposed control panel forming no part of this invention. If desired, instead of providing a separate solenoid 63 for each resetting arm 57, several arms may all be displaced simultaneously by providing them with a common controlling solenoid.

What I claim then is:

1. A conveyor system of the kind comprising a plurality of article supporting elements power advanced along a track element, one of said two elements being provided with a pre-selectable control device comprising a plurality of control members mounted for independent rotational movement about a common axis relative to a supporting member carried by said one element so as to be movable between an inoperative position and an operative position in which each control member co-acts with operating means on the other of said two elements characterized in the provision of means acting between each control member and their supporting member controlling the rotational movement of each control member relative to its supporting member, said rotational movement control means comprising the combination of;
    (a) a pair of axially opposed thrust plates,
    (b) resilient means urging said thrust plates towards one another,
    (c) one of said two members between which the rotatable control means acts having a through opening therein with a control ball freely rotatable within said opening and engaging on opposite sides thereof with the opposed faces of said two thrust plates,
    (d) means connecting the other of said two members to one of said two thrust plates,
    (e) said so connected thrust plate having a plurality of ball receiving depressions spaced circumferentially around said common axis of rotation, with said thrust plate having a V-sectioned projection portion separating circumferentially adjacent depressions,
    (f) and means mounting the other of said two thrust plates for free rotational movement about said common axis.

2. A conveyor system according to claim 1 wherein each rotatable control member is formed with a pair of through openings spaced diametrically on opposite sides of its axis of rotation, in each of which openings is disposed a control ball with means connecting the thrust plate having the depressions to the supporting member, said last mentioned thrust plate having a plurality of depressions on each of two opposite sides of the axis of rotation of the control member and spaced circumferentially therearound with a V-sectioned projection disposed on opposite sides of said axis of rotation between circumferentially adjacent depressions with the projection extending radially in respect of such axis.

3. A conveyor system according to claim 1, further characterized in that each control means constitutes a self contained unit, the arrangement permitting of each control means being provided with a variable number of differently positioned control members as required.

4. A conveyor system according to claim 3, further characterized in that each control member, supporting member, and thrust plates are mounted upon a supporting sleeve, opposite ends of which are flanged so as to retain in position the several parts mounted on the sleeve.

5. A conveyor system according to claim 4, further characterized in that the supporting sleeves are mounted in end-to-end relationship upon a common supporting tube with the flanged ends of axially adjacent supporting sleeves in abutment with one another to retain the control members in the desired axially spaced relationship.

6. A conveyor system of the kind specified which is characterized by embodying a plurality of preselectable control means comprising a plurality of control elements mounted upon a supporting member for rotational movement about a common axis, with the elements spaced apart from one another in a direction along the length of the axis of rotation, so as to be displaceable relative to the supporting member into one or more pre-selected positions, means being provided for releasably retaining each control element in the pre-selected position and means being provided for returning each control element to its pre-selected position in the event of the control element being turned relative to its supporting member out of a pre-selected position through an angular distance less than half the distance required to displace the control element rotationally from the pre-selected position to the next rotationally adjacent position relative to its supporting member, each of said control means comprising a supporting frame of channel configuration, with a pair of tubes extending in side-by-side parallel relationship between the two arms of the frame, with each of the control elements being mounted for rotational movement about one of the two tubes, said supporting member being in the form of a plate through which said one tube passes, with the supporting plate in engagement with the other of the two tubes, so as thereby to be restrained against rotational movement, with the rotatable members of each control element acting between each control element and the associated supporting plate.

References Cited
UNITED STATES PATENTS

| 748,018 | 12/1903 | Rowe. | |
|---|---|---|---|
| 2,315,357 | 3/1943 | Smith. | |
| 2,751,091 | 6/1956 | Freeman. | |
| 2,989,928 | 6/1961 | Fletcher et al. | 104—88 |
| 3,096,665 | 7/1963 | Cappelle et al. | 74—527 |
| 3,226,999 | 1/1966 | Allison | 74—527 |

ARTHUR L. LA POINT, *Primary Examiner.*

J. E. BABER, *Assistant Examiner.*